(12) United States Patent
Romanucci

(10) Patent No.: US 11,497,335 B2
(45) Date of Patent: Nov. 15, 2022

(54) PARCEL SAFE REMOTE VEHICLE ALIGNMENT SYSTEM

(71) Applicant: Rebecca Romanucci, Scottsdale, AZ (US)

(72) Inventor: Rebecca Romanucci, Scottsdale, AZ (US)

( * ) Notice: Subject to any disclaimer, the term of this patent is extended or adjusted under 35 U.S.C. 154(b) by 274 days.

(21) Appl. No.: 16/896,652

(22) Filed: Jun. 9, 2020

(65) Prior Publication Data

US 2020/0390260 A1   Dec. 17, 2020

Related U.S. Application Data

(60) Provisional application No. 62/861,952, filed on Jun. 14, 2019.

(51) Int. Cl.
*A47G 29/14* (2006.01)
*A47G 29/30* (2006.01)
*B64F 1/32* (2006.01)

(52) U.S. Cl.
CPC .......... *A47G 29/141* (2013.01); *A47G 29/30* (2013.01); *B64F 1/32* (2013.01); *A47G 2029/146* (2013.01); *A47G 2029/149* (2013.01); *B64C 2201/128* (2013.01)

(58) Field of Classification Search
CPC ...... A47G 29/141; A47G 29/20; A47G 29/30; A47G 2029/146; A47G 2029/149; B64F 1/32; B64C 39/02; B64C 39/024; B64C 2201/128; B64D 1/02; B64D 1/12; G06Q 10/083; G06Q 10/0832; G06Q 50/28
USPC .......... 232/19, 45; 244/114 R, 118.1, 118.2, 244/137.1, 137.4; 340/569; 705/330; 200/61.63
See application file for complete search history.

(56) References Cited

U.S. PATENT DOCUMENTS

| | | | |
|---|---|---|---|
| 9,741,010 B1 * | 8/2017 | Heinla | G06Q 10/083 |
| 10,039,401 B1 * | 8/2018 | Romanucci | A47G 29/141 |
| 10,993,567 B1 * | 5/2021 | Cabral-McKeand | ...... A47G 29/141 |
| 11,160,409 B2 * | 11/2021 | Bowman | A47G 29/30 |
| 11,166,580 B2 * | 11/2021 | Waisanen | E05F 15/616 |
| 11,250,652 B2 * | 2/2022 | Sengstaken, Jr. | G06K 7/10366 |
| 2005/0253715 A1 * | 11/2005 | Awobue | A47G 29/124 340/569 |
| 2016/0033966 A1 * | 2/2016 | Farris | A47G 29/122 701/16 |
| 2016/0159496 A1 * | 6/2016 | O'Toole | B64C 39/024 244/110 E |
| 2017/0116568 A1 * | 4/2017 | Pleis | A47G 29/14 |

(Continued)

FOREIGN PATENT DOCUMENTS

CA   2227503 A1 *  2/1997

*Primary Examiner* — William L Miller
(74) *Attorney, Agent, or Firm* — Parsons & Goltry; Robert Parsons; Michael Goltry

(57) ABSTRACT

A parcel safe for remote vehicle pickup and delivery of packages including a container having an opening for receiving or deploying packages. The container has a lockable lid associated with the opening and has a closed position and an open position. The container and associated lid define a package receiving surface in the open position. Alignment apparatus is associated with the package receiving surface and provides an index for a receiving point of the package receiving surface. The alignment apparatus is designed for use by a remote vehicle in a pickup or delivery process.

6 Claims, 4 Drawing Sheets

(56) References Cited

U.S. PATENT DOCUMENTS

| | | | | |
|---|---|---|---|---|
| 2017/0228692 | A1* | 8/2017 | Pargoe | H04W 4/80 |
| 2018/0070753 | A1* | 3/2018 | Eveloff | H04W 4/025 |
| 2018/0092484 | A1* | 4/2018 | Lewis | B64C 39/024 |
| 2018/0228311 | A1* | 8/2018 | Bloom | A47G 29/20 |
| 2018/0245365 | A1* | 8/2018 | Wankewycz | H02J 7/0042 |
| 2019/0000255 | A1* | 1/2019 | Dehner | A47G 29/141 |
| 2019/0287051 | A1* | 9/2019 | Heinla | G06Q 50/28 |
| 2020/0005238 | A1* | 1/2020 | Richardson | A47G 29/141 |
| 2020/0048951 | A1* | 2/2020 | Herschap | G07C 9/38 |
| 2020/0093310 | A1* | 3/2020 | Hauck | A47G 29/20 |
| 2020/0113365 | A1* | 4/2020 | Shobe | B64C 39/00 |
| 2020/0237946 | A1* | 7/2020 | Shell | A47G 29/141 |
| 2020/0245798 | A1* | 8/2020 | Perez Friscia | A47G 7/04 |
| 2020/0281386 | A1* | 9/2020 | Knox | A47G 29/22 |
| 2020/0288895 | A1* | 9/2020 | Bennet | A47G 29/141 |
| 2020/0393854 | A1* | 12/2020 | Romanucci | G05D 1/0088 |
| 2021/0015286 | A1* | 1/2021 | McCloskey, III | A47G 29/20 |
| 2021/0022536 | A1* | 1/2021 | Anderson | A47G 29/141 |
| 2021/0030185 | A1* | 2/2021 | Rogers | G06Q 10/083 |
| 2021/0045563 | A1* | 2/2021 | Bartley-Clark | A47G 29/141 |
| 2021/0070468 | A1* | 3/2021 | Svirsky | B64F 1/222 |
| 2021/0148157 | A1* | 5/2021 | Muniz | E05G 1/005 |
| 2021/0228009 | A1* | 7/2021 | Nakanishi | A47G 29/124 |
| 2021/0321807 | A1* | 10/2021 | Needier | G07C 9/00912 |
| 2021/0393065 | A1* | 12/2021 | Melancon | A47G 29/141 |
| 2022/0004974 | A1* | 1/2022 | Heinla | G06Q 10/087 |
| 2022/0055770 | A1* | 2/2022 | O'Toole | H04W 12/037 |

* cited by examiner

000# PARCEL SAFE REMOTE VEHICLE ALIGNMENT SYSTEM

CROSS-REFERENCE TO RELATED APPLICATION

This application claims the benefit of U.S. Provisional Application No. 62/861,952, filed 14 Jun. 2019.

FIELD OF THE INVENTION

This invention relates to the alignment of a remote delivery/pickup vehicle with a secure safe that includes "smart" electronics and apparatus.

BACKGROUND OF THE INVENTION

Hundreds of millions of parcels are processed, outgoing and incoming, to and from homes and businesses yearly. Many of the parcels are lost, stolen, or damaged. Many require a signature or for someone to be present at the point of interaction. Parcels may be held, requiring multiple delivery/pick-up attempts, wasting time driving and waiting in long lines, wasting fuel and contributing to negative environmental effects from excessive use of fuel and packaging materials. Perishable parcels such as groceries, medications, restaurant food deliveries, electronics, flowers, wine and more, are either undeliverable or at risk of being damaged or destroyed by being exposed to the elements such as heat, cold, rain, wind, sun, ice and other inclement weather and extreme conditions and may likely jeopardize the efficacy of medication, potentially rendering it useless, harmful or even fatal for use. It may spoil food, placing, especially the very young, immuno-compromised and the elderly, people at risk for poisoning.

A smart parcel safe which overcomes many or all of these difficulties is described in U.S. Pat. No. 10,039,401, entitled "Smart Parcel Safe", issued Aug. 7, 2018. Mention is made in the patent of drone delivery to the smart parcel safe however, very little is disclosed as to how this operation cam be accomplished. Placing a package of a size close to the opening in the smart parcel safe, or other parcel receiving and deploying container, by a remote delivery/pickup vehicle, such as a drone flying above the smart parcel container, can be a very daunting operation.

It would be highly advantageous, therefore, to remedy the foregoing and other deficiencies inherent in the prior art.

Accordingly, it is an object of the present invention to provide new and improved remote delivery/pickup vehicle alignment apparatus and procedures in cooperation with a smart parcel safe or other container.

It is another object of the present invention to provide a new and improved smart parcel safe or other container that syncs with a mobile device to remotely control functions.

SUMMARY OF THE INVENTION

Briefly to achieve the desired objects and advantages of the instant invention in accordance with a preferred embodiment a parcel safe for remote vehicle pickup and delivery of packages is provided. The parcel safe includes a container having an opening for receiving packages therethrough and a lid coupled to the container by powered hinges. The lid is movable between a closed position, closing the opening in the container and an open position giving access to the opening of the container. An externally controllable locking mechanism is carried by one of the container and the lid and movable between a locked orientation, locking the lid in the closed position, and an unlocked orientation allowing movement of the lid to the open position. A package receiving surface is defined by the container and the lid in the open position and an alignment apparatus is associated with the package receiving surface and provides an index for a receiving point of the package receiving surface. A remote vehicle, for retrieving and delivering parcels, includes sensors for sensing and orienting with respect to the alignment apparatus in a pickup or delivery process.

To further achieve the desired objects and advantages of the present invention a more specific method of delivering packages to a parcel safe by a remote vehicle comprising the step of providing a container having an opening for receiving or deploying packages, the container having a lockable lid associated with the opening and having a closed orientation and an open orientation, and the container and associated lid defining a package receiving surface in the open orientation, and alignment apparatus associated with the package receiving surface and providing an index for the center of the package receiving surface, and the alignment apparatus designed for use by a remote vehicle in a pickup or delivery process. The method further including the steps of moving the lid into the open orientation in response to a signal from a remote vehicle or remote vehicle controller to expose the package receiving surface and moving the lid into the closed orientation in response to a signal from the remote vehicle that a package has been delivered to the package receiving surface.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION OF THE DRAWINGS

Figure 1A:
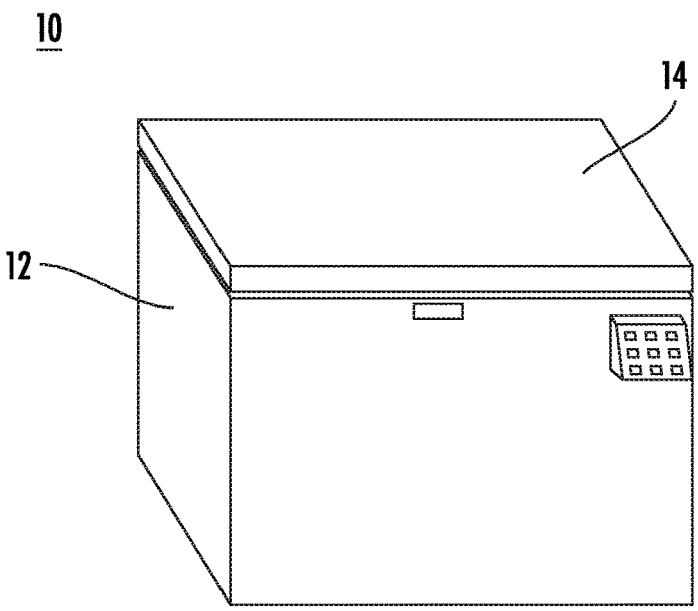
FIG. 1A is a perspective front view of a parcel safe according to the present invention.
Figure 1B:
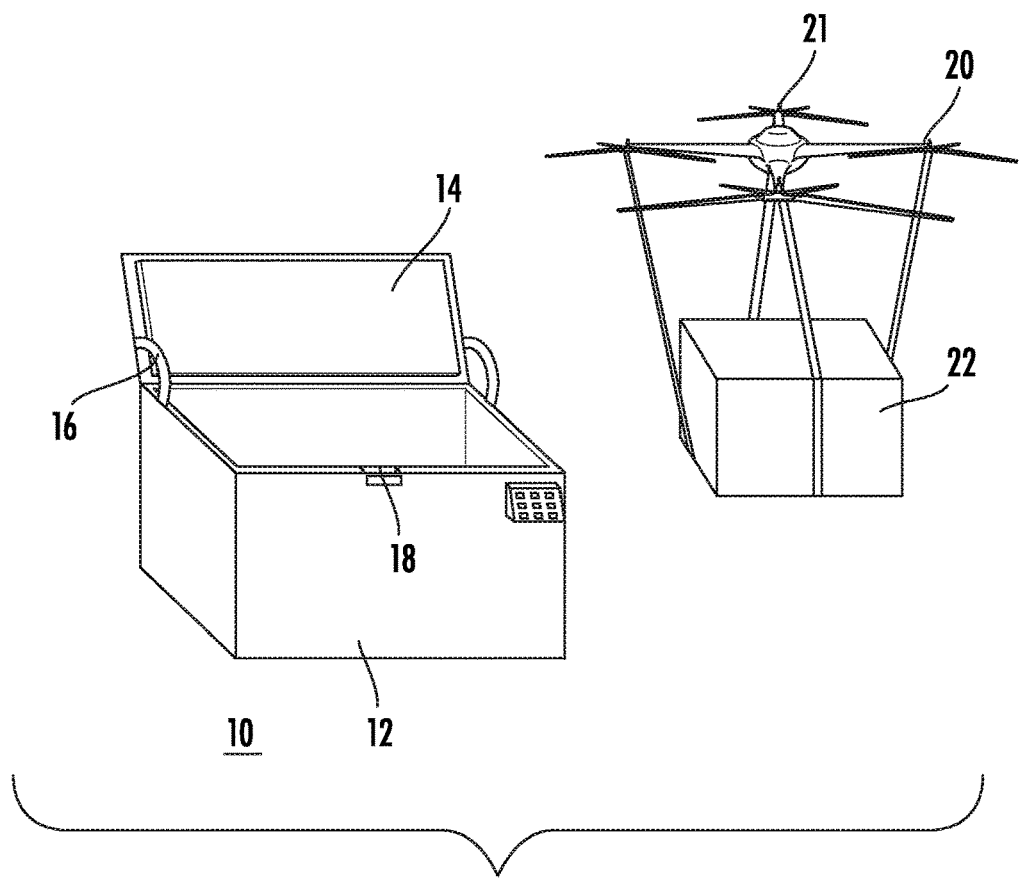
FIG. 1B is a perspective front view of the parcel safe in a lid open orientation with a delivery drone carrying a package approaching.

Turning now to the drawings in which like reference characters indicate corresponding elements throughout the several views, attention is directed to FIGS. 1A and 1B which illustrate a parcel safe 10 in accordance with the present invention. While a smart parcel safe is preferred, as disclosed in U.S. Pat. No. 10,039,401, entitled "Smart Parcel Safe", issued Aug. 7, 2018, and incorporated by reference herein, it should be understood that any container constructed to receive or deploy items is defined herein as a "parcel safe" 10. Also, in this specific example, parcel safe 10 generally includes a container 12 and a lid 14. In the present specific example, safe 10 is illustrated as a rectangularly shaped box, having an upwardly directed opening closed by lid 14. Also, lid 14 is releasably locked to container 12 by an externally controllable locking mechanism 18. It should be understood that container 12 is shown as rectangular, but can be provided in any convenient shape. Generally, it is anticipated that safe 10 will be provided in a variety of sizes and the particular size selected by a user/owner will be in accordance with their specific needs. For example, large for high use owners; medium for normal or generic users; and a smaller item (like a commercially available storage container) for apartments and the like.

It will be understood that container 12 can have an opening in a front or side, closed by lid 14 operating similar to a door on a refrigerator. Whether lid 14 closes a top, side, front, or back of container 12, it will be considered a lid for convenience. Safe 10 might be a stand-alone item or it could be incorporated into a multiple unit assembly or some specific piece of lawn or patio furniture, such as a table or bench, and could include a size and shape according to the piece of furniture. Further, safe 10 can be fixed in a specific location or movable to different locations.

As illustrated in FIG. 1B, lid 14 will need to open to at least a vertical orientation and preferably an additional ten or twenty degrees, so that remote delivery/pickup vehicles, can drop off deliveries and pick up deliveries. The term "remote delivery/pickup vehicle" is intended to include remote controlled vehicles such as drones (flying) and rover robots (ground movement). Remote vehicles are controlled by a controller system either autonomously or manually. In the preferred embodiment a drone 20 is employed, but it will be understood that a rover robot can also be employed with this system. Drone 20 is a drone capable of controlled flight and controlled by a controller, either computer operated or manually operated. Drone 20 is illustrated carrying a package 22 and approaching safe 10. Lid 14 is attached to container 12 by one or more hinges 16 which may be any type of powered hinge available on the market. Hinge or hinges 16 may be controlled directly by communication through a communication system, such as WiFi or Bluetooth, from drone 20. It will be understood that when it is stated that the lock and hinge are controlled by drone 20, that includes the controller of drone 20. That is, upon an 'open' command from drone 20 (includes the controller), lid 14 unlocks and is pushed open by hinges 16. Similarly, upon receiving a 'close' command from drone 20 (includes the controller), lid 14 closes and locks. It should be understood that safe 10 doesn't have to communicate directly through WiFi or Bluetooth but communication could take place through some other media, such as the internet. It should also be noted that while the preferred embodiment employs lid 14 with hinges 16 for pivotal movement, lid 14 can also employ hinges for a lateral sliding movement. These hinges include tracks and grooves, allowing lid 14 to be opened by a lateral sliding movement. These hinges are also powered to allow remote opening of lid 14.

Figure 2:
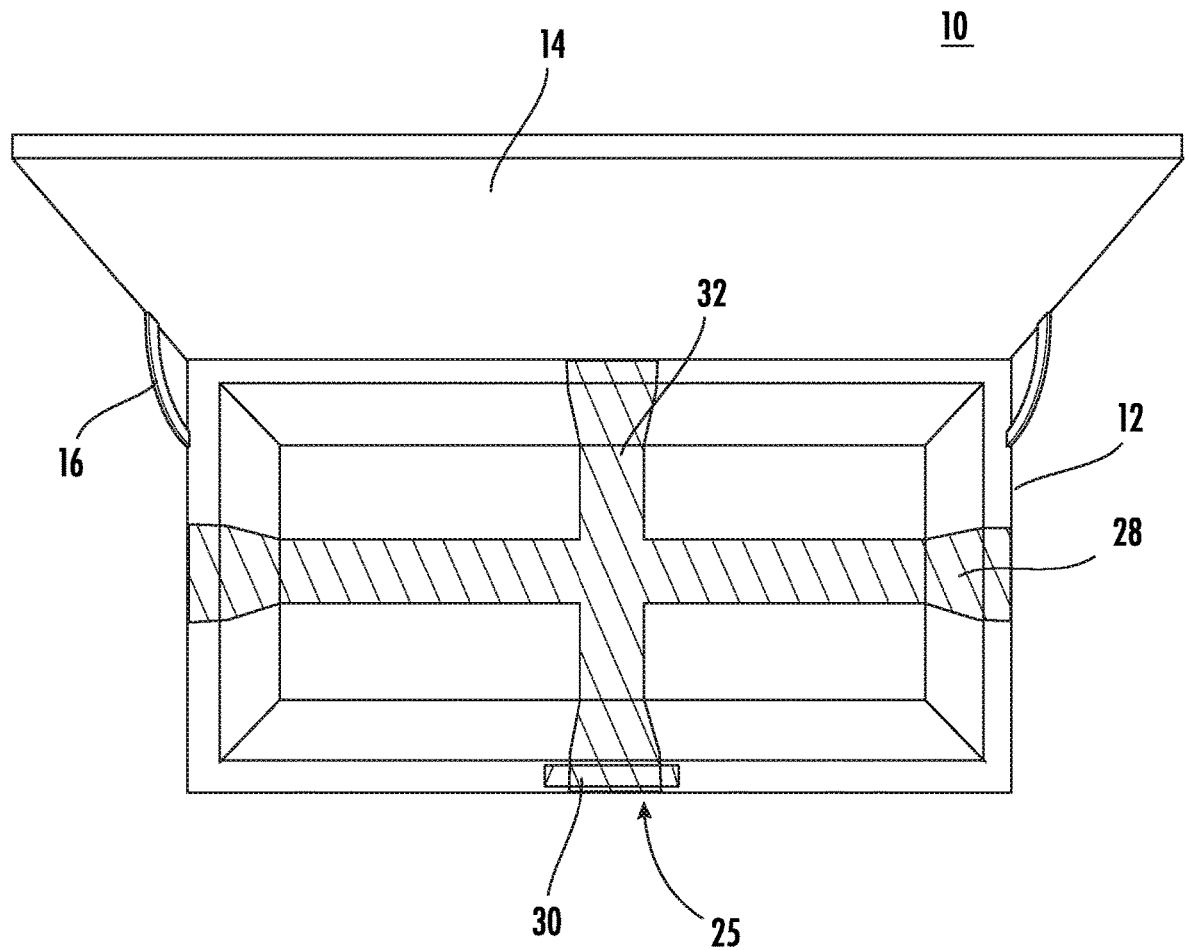
FIG. 2 is a top view of the parcel safe, lid open, with alignment apparatus, in accordance with the present invention.

Turning to FIG. 2, a top view of safe 10 with lid 14 open and alignment apparatus 25 visible from a position above safe 10, in accordance with the present invention. Alignment apparatus 25 provides an index for a parcel receiving point of the package receiving surface. While the index is preferably the center of the package receiving surface, other points may be desirable. In this example alignment apparatus 25 includes a first member 28 painted or otherwise deposited on the inner surface of container 12 so as to extend along the longitudinal dimension of container 12 and generally centrally located (i.e. along the lateral direction). First member 28 may extend down the side walls of container 12 or may simply be deposited on the bottom surface. Similarly, a second member 30 is painted or otherwise deposited on the inner surface of container 12 so as to extend along the lateral dimension of container 12 and generally centrally located (i.e. along the longitudinal direction). Thus, a point 32 where the indicium, first member 28 and second member 30, cross defines the center of container 12. First member 28 and second member 30 can be formed by material that enhances recognition during adverse conditions, e.g. infrared paint, reflective material, etc.

First member 28 and second member 30 will preferably include some form of recognizable calibrations so that the delivery/pickup vehicle, such as drone 20 can, through sensors 21, recognize and zero in on point 32 to ensure that package 22 is positioned within container 12 and does not engage the sides. Such calibration may be for example lines distributed along the length of first member 28 and second member 30 so as to be spaced apart different amounts as point 32 is approached. Other calibration schemes might be different sized geometric figures (e.g. circles, squares, etc. or some form of color coding. Here it should be noted that sensors 21 on drone 20 (see FIG. 1B) might be located at the ends of support arms so that package 22 doesn't interfere with the sensing procedure. Furthermore, sensors can include optics for a manual operator. The is also the case for a rover robot traveling on wheels along the ground.

Figure 3:
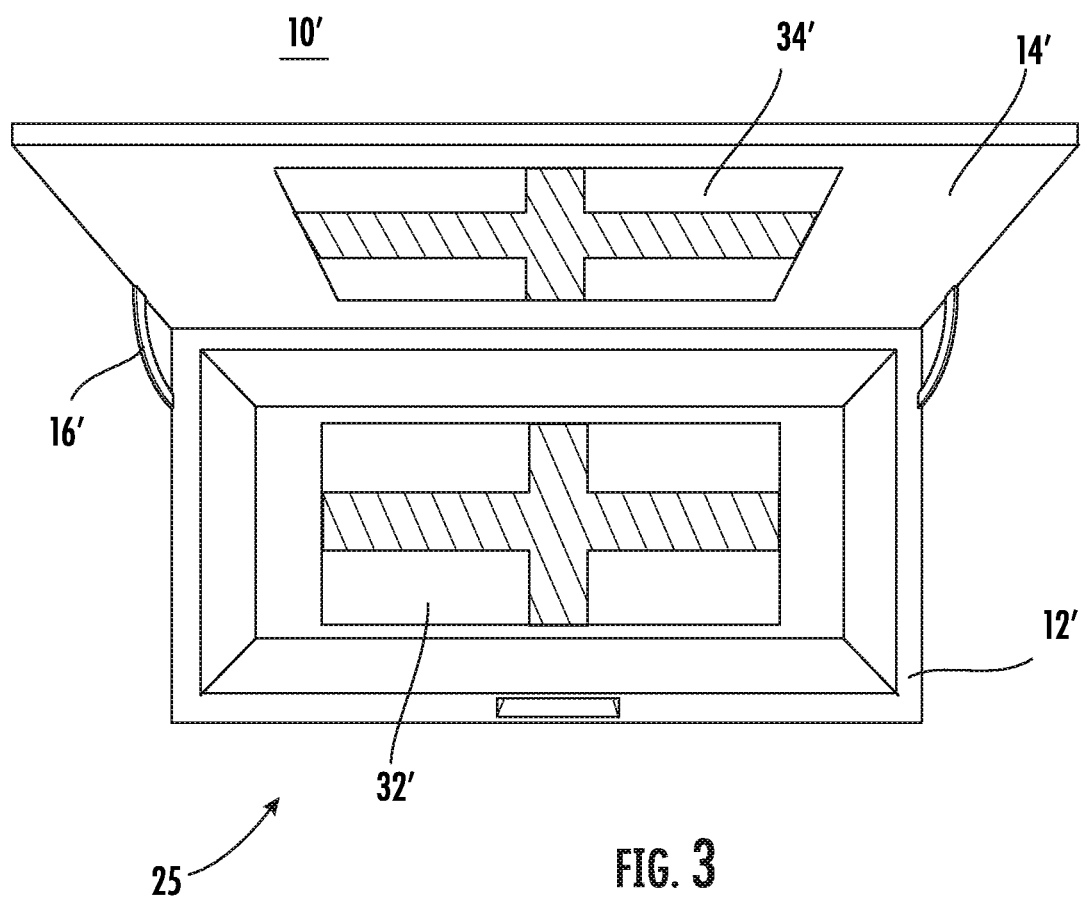
FIG. 3 is a top view of the parcel safe, lid open, with another example of alignment apparatus, in accordance with the present invention.

Turning to FIG. 3, a container or safe 10' with another embodiment of alignment apparatus, designated 25', is illustrated. Components in FIG. 3 similar to components in FIG. 2 are designated with similar numbers having a prime (') added to indicate the different example. In this example, alignment apparatus 25' includes a first pattern 32', affixed to the bottom surface of container 10', and a second pattern 34', affixed to cover 14'. Patterns 32' and 34', in this specific example are rectangularly shaped (e.g. one foot square), with cross-members, similar to first member 28 and second member 30 of FIG. 2, formed thereon. It should be understood that while crosses (first member 28 and second member 30) are described for their simplicity, other geometric patterns might be used, such concentric circles diminishing in diameter in a regular pattern.

Patterns 32' and 34' are positioned centrally on the bottom surface of container 12' and on the inner surface of cover 14', respectively. In this example, it is preferred that cover 14' open 180 degrees to provide a flat horizontally oriented surface for pattern 34'. In this specific example, a drone delivering a package can align the package with container 12' using pattern 32', where sensors are located at the outer extremes of support arms, as described above. In instances where sensors are located in different positions, it may be expedient to zero in on pattern 34' and introduce an offset into the calibration system of the drone. In some instances, the drone sensing and calibration system might use both patterns 32' and 34' to aid in ensuring accurate package placement.

Figure 4:
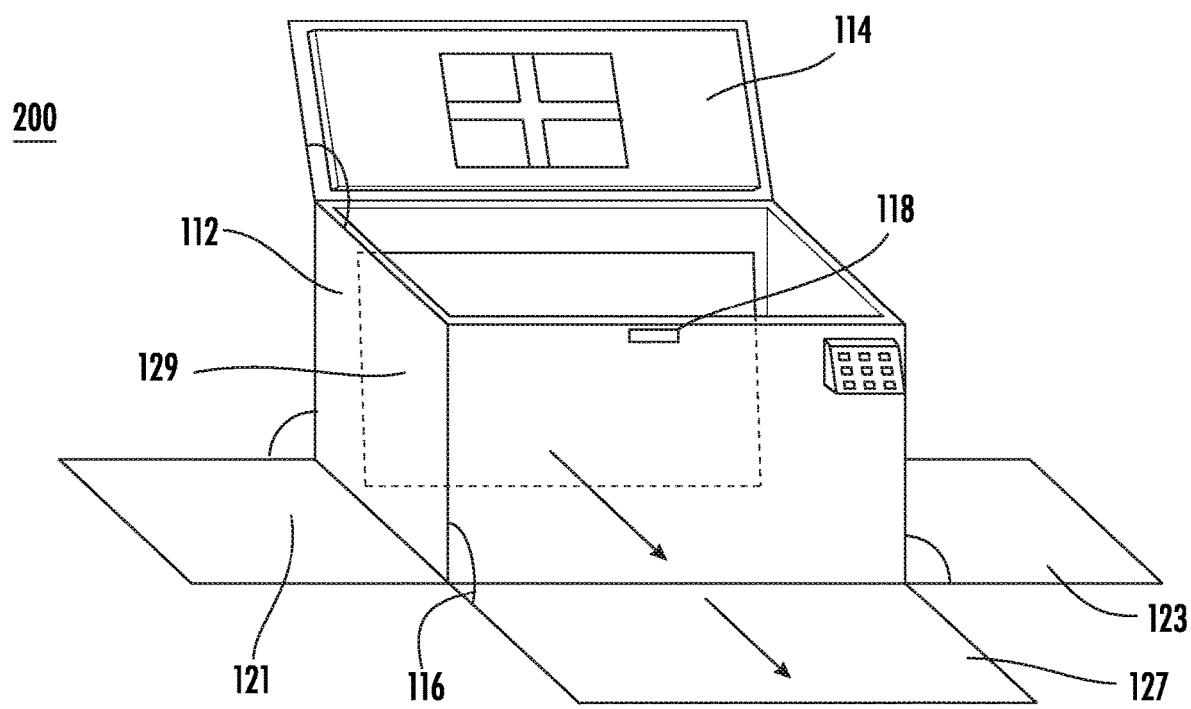
FIG. 4 is a perspective front view of the parcel safe with collapsible sidewalls for drone pickup.

Turning now to FIG. 4, another example of a safe, designated 100, is illustrated. Safe 100 includes a container 112 and a lid 114. In this example, lid 114 operates as described above. That is, it is releasably locked to container 112 by an externally controllable locking mechanism 118. Also, in this example, at least one of sides 121 and 123 are attached to container 112 by one or more hinges 116, which may be any type of powered hinge available on the market, so as to move from a normal upright position into a flat horizontal orientation. Further, a front wall 127 is attached to container 112 by one or more hinges 116, as described above. Hinge or hinges 116 may be controlled directly by communication through a communication system, such as WiFi or Bluetooth, from a drone as explained above. Further, an externally controllable motorized rear wall 129, generally parallel with the rear wall of container 112 is provided to move packages out of container 112 for easy pickup by a drone. Prior to activating motorized rear wall 129, front wall 127 will be moved into a flat horizontal, position to serve as a pick-up platform for any packages contained within container 112.

Additionally or alternatively, it should be noted that a movable side panel (e.g. side panel 121, 123, or 127) could be employed to receive packages. The side panel could be dropped to a horizontal position for receipt of packages and contain alignment apparatus. When the side panel is returned to the vertical position, such as by a motorized or powered hinge, the package would be deposited within safe 10.

Thus, a new and improved remote delivery/pickup vehicle alignment apparatus and procedure is disclosed for use with a parcel safe. The new and improved remote delivery/pickup vehicle alignment apparatus and procedure in cooperation with a parcel safe allows and enhances remote vehicle deliveries and pick-ups. Also, a new and improved parcel safe delivery system or operation is disclosed.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A parcel safe for remote vehicle pickup and delivery of packages comprising:
   a container having an opening for receiving packages therethrough;
   a lid coupled to the container by powered hinges and movable between a closed position, closing the opening in the container and an open position giving access to the opening of the container;
   an externally controllable locking mechanism carried by one of the container and the lid and movable between a locked orientation, locking the lid in the closed position, and an unlocked orientation allowing movement of the lid to the open position;
   a package receiving surface defined by the container and the lid in the open position;
   alignment apparatus associated with the package receiving surface and providing an index for a receiving point of the package receiving surface, wherein the alignment apparatus includes a first member and a second member crossing each other at an angle with the center crossing point positioned at the receiving point of the package receiving surface, the first member and the second member include a recognizable calibration which includes lines distributed along the length of the first member and the second member so as to be spaced apart different amounts as the center crossing point is approached; and
   a remote vehicle, for retrieving and delivering parcels, the remote vehicle including sensors for sensing and orienting with respect to the alignment apparatus in a pickup or delivery process.

2. The parcel safe for remote vehicle pickup and delivery as claimed in claim 1 wherein the container includes a smart parcel safe.

3. The parcel safe for remote vehicle pickup and delivery as claimed in claim 1 wherein the first member and the second member are painted or otherwise deposited indicium on the package receiving surface.

4. The parcel safe for remote vehicle pickup and delivery as claimed in claim 1 wherein the lid opens to at least a perpendicular orientation relative the container.

5. The parcel safe for remote vehicle pickup and delivery as claimed in claim 4 wherein the alignment apparatus is positioned on one of the container and the lid in the open position.

6. The parcel safe for remote vehicle pickup and delivery as claimed in claim 1 wherein the locking mechanism and the powered hinges are controllable by the remote vehicle or remote vehicle controller.

\* \* \* \* \*